March 18, 1969 D. B. HALSTEAD 3,432,985
STRIP PACKAGING MACHINE FOR NAILS AND OTHER SIMILAR ARTICLES
Filed Oct. 4, 1965 Sheet 2 of 2
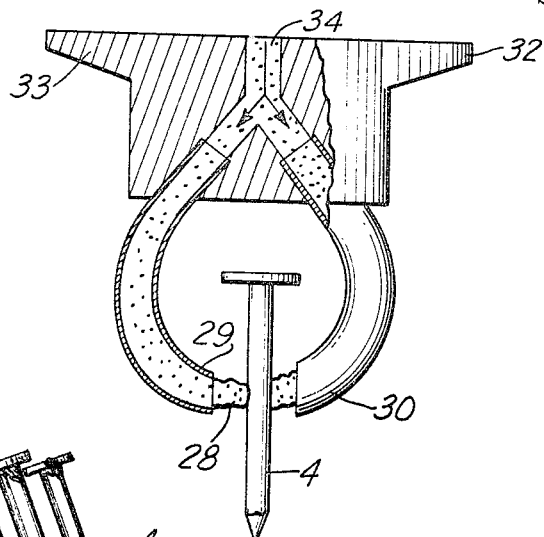
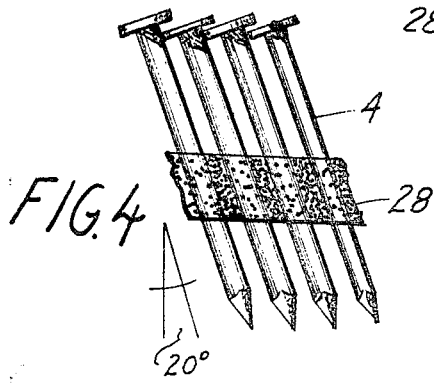
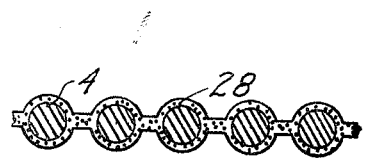
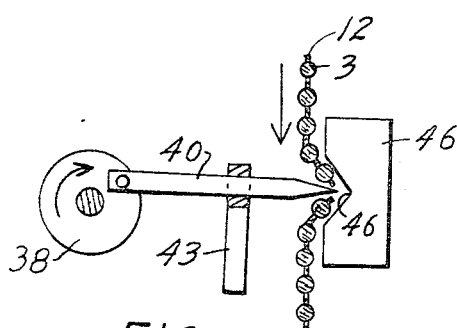
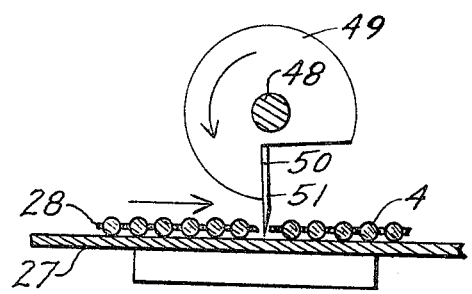
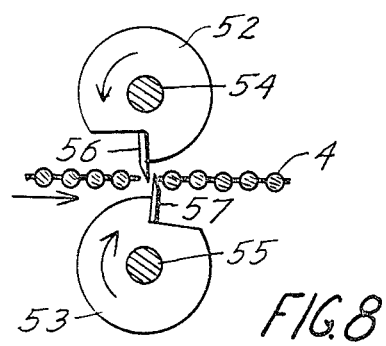
INVENTOR.
DONALD B. HALSTEAD
BY Earl E. Moore
ATTY.

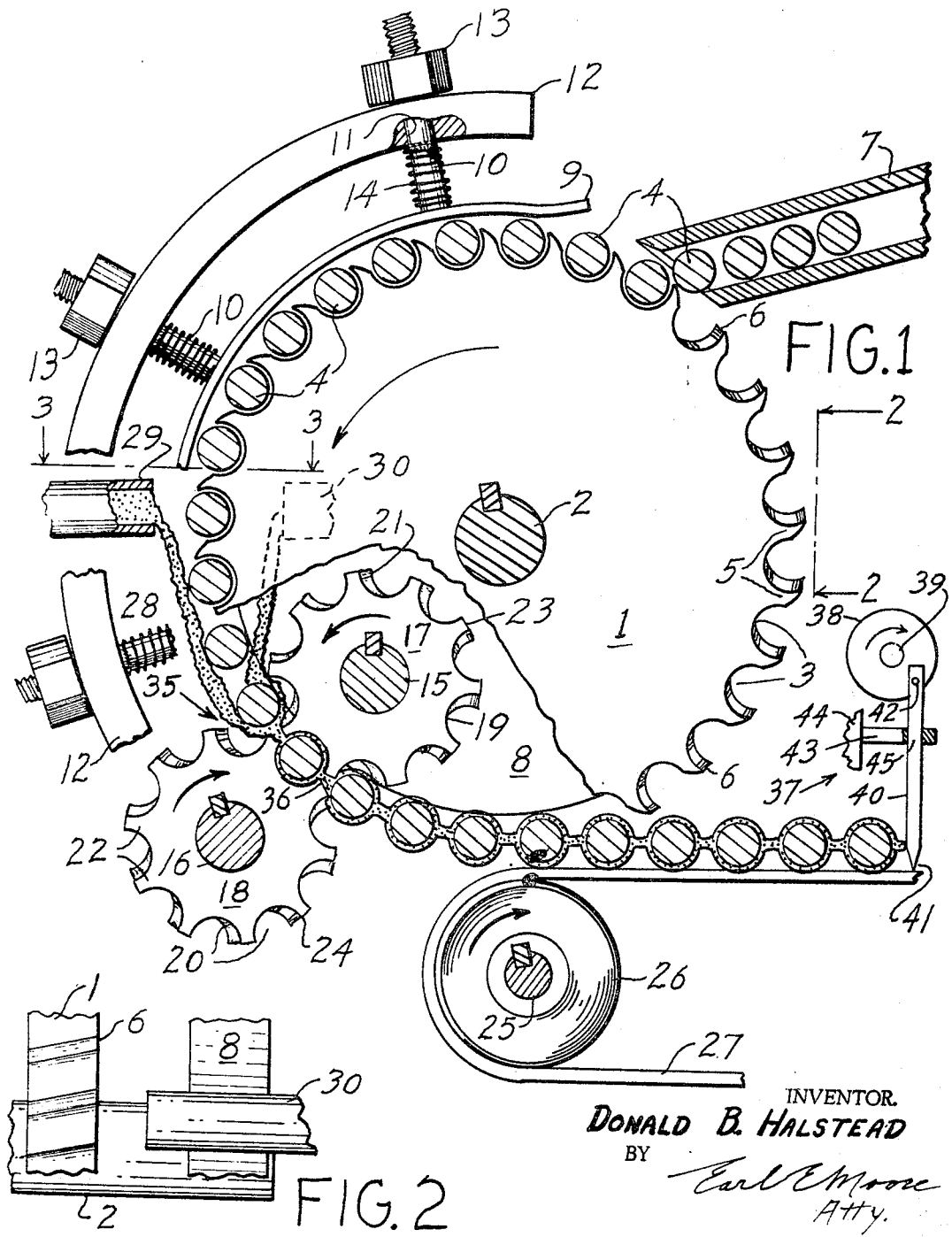

United States Patent Office 3,432,985
Patented Mar. 18, 1969

3,432,985
STRIP PACKAGING MACHINE FOR NAILS AND OTHER SIMILAR ARTICLES
Donald B. Halstead, 278 Foxbury St., Pomona, Calif. 91767
Filed Oct. 4, 1965, Ser. No. 492,827
U.S. Cl. 53—140                    7 Claims
Int. Cl. B65b 13/00, 27/10; B29f 1/10

ABSTRACT OF THE DISCLOSURE

A machine is provided for packaging articles such as nails and the like in plastic strip packs. The machine includes a pair of plastic molding wheels having spaced parallel axes of rotation and circumferentially spaced teeth defining intervening article receiving pockets that rotate in unison through a molding station between the wheels and receive the nails or other articles to be packaged. A fluent plastic is fed to the molding station in such a way as to form a continuous plastic strip which incapsulates the articles emerging from the molding station. The tips of the teeth on the molding wheels are slightly spaced to indent the plastic strip between the articles into thin connecting webs.

---

This invention relates to a machine for packaging elongated elements means, ways and methods, of packaging elongated elements such as nails, pins etc. As for nails and the like, they are packaged in strip form of predetermined lengths and arranged and designed to be fed into a nailing machine and the like.

A rotary type of collation means is provided for guiding and feeding the elongated elements to a plasticizing area where the plastic material is squeezed about the elements as they pass through a throat-like area and then the elements, in strip form, are fed from the area to another area where the strips are cut to certain predetermined lengths in accordance to the use in which they are to be put.

One of the principal objects of this invention is to present a packaging machine for elongated elements method and means for elongated elements to be marketed in various lengths.

Another object is to provide means for packaging elements or things to provide units of predetermined size for a specific use.

Other objects of the invention will become apparent upon perusal of the specification and drawings accompanying same.

In the drawings:

FIG. 1 is an elevational view of a packaging machine with parts in section, and parts broken away;

FIG. 2 is an elevational view taken along the line 2—2 of FIG. 1;

FIG. 3 is a horizontal view, parts in section, showing in detail a plastic feeding means of the invention and which view of the means is taken along the line 3—3 of FIG. 1;

FIG. 4 is an elevational view of a short strip of packaged nails;

FIG. 5 is a sectional view through a strip of packaged nails;

FIG. 6 is an elevational view, partly sectional, showing a means for cutting a long strip of nails into shorter lengths;

FIG. 7 is an elevational view, partly in section, showing another means for cutting long strips of packaged nails into shorter strips;

FIG. 8 is an elevational view, parts in section, showing still another means for cutting strips of packaged nails and the like.

Now, referring to the accompanying drawings, wherein like parts bear the same reference characters, the numeral 1 indicates a disc-like collating wheel or carrier wheel mounted upon a shaft 2 and keyed thereto, as shown. This carrier wheel is provided with a plurality of pockets or element holders 3 which are sized in all directions to accommodate the elements 4, and which elements in this particular case are nails. The pockets each have the teeth means 5 configurated to present a somewhat sharp tooth end 6 which is designed to be interjected between nails of a train of nails which are being fed from an inclined chute means 7. This chute means extends from a suitable storage chamber, hopper, or nail supply, not shown, wherein nails are placed and suitably alined for orderly passage through the chute in train fashion, that is, the heads of the nails are one on top of the other as shown in FIG. 4 of the drawings.

A wheel-like bearing means 8 is provided to support one end of the shaft 2 and which gives further support and guidance to the nails in the pockets; this disc-like bearing 8 is spaced along the shaft 2 from the wheel 1 and can be adjusted to accommodate various nail lengths. For purposes of keeping the nails in their respective pockets, a guide bar or means 9 is provided and this guide strip or bar means is attached to the plurality of stem 10 which slide through bores 11 in a holder or yoke means 12, as shown. Obviously, suitable mechanical means are provided to properly support the yoke means as well as other parts of the machine. The top end portion of the stems are threaded to accommodate the nuts 13. Each stem is provided with a coiled compression spring means 14 having ends pressing against the guide and yoke means. The nuts are adjusted to provide proper pressure of the spring against the guide 9 and hence against the nails in the pockets 3 of the wheel 1.

A pair of spaced apart shafts 15 and 16 are provided and have keyed thereto their respective gear-like wheels 17 and 18. These wheels also have pockets or valleys 19 and 20 respectively and the die-like teeth 21 and 22 respectively of these wheels have flat-like top surfaces indicated at 23 and 24. When the flat-surfaced die-like portions 23 and 24 are in opposition with each other, a small predesigned space exists so as to leave room for plastic material to form a proper strip or web, a feature to be explained later.

A shaft 25 is provided and has keyed thereto a drum or flexible belt wheel 26 to which is attached an endless belt means 27 for carrying away the plasticized or packaged nails 4. It is deemed unnecessary to show or explain the entire endless belt means in that it should be obvious that another belt wheel is provided to support the unseen end of the belt means 27.

The plastic material may be any kind suitable for the purposes of this invention and there are a great variety of plastic materials on the market that can be satisfactory for employment for packaging nails and the like. For instance, flexible types of plastic material should be used such as the acrylic plastic, polystyrene, or any of the thermoplastic resins and even rubber and the like. The numeral 28 indicates the plastic material (the flexible or hardened type when set) and it is shown in FIG. 1 as being flowed or pressure oozed from the pair of spaced apart egress ends of the ducts or pipes 29 and 30. These ducts extend from a holder means 31 which is supported in any suitable manner on or about the machine. The holder is provided with ears 32 and 33 so that it can be readily fastened in place with clamps or bolts. Within this holder 31 there is a common feed bore or means 34 that is connected to a source of supply for the plastic material, not shown, and this bore branches out to feed material to both of the ducts 29 and 30. That shown in FIG. 3 is a horizontal view along the line 3—3 in the direction of the arrows of FIG. 1.

Now, as the plastic material 28 is fed from the ducts 29 and 30 and the wheel 1 and wheels 17–18 rotated at the ideal speed, the plastic from both ducts converge as the nails move along the throat portion or area 35 and this brings the plastic material together at the throat portion. The nails at the throat portion are enveloped by the plastic in spaced apart formation. As the plastic covered nails pass through the throat portion they are squeezed by the pair of wheels 17 and 18 about the middle portions of the nails and this action, due to surfaces 23 and 24, provides a thin web at 36 between adjacent nails and in this manner a long endless strip of packaged nails evolve.

For cutting the strips at predetermined lengths, the cutter means 37 is provided. A wheel 38 is keyed to a shaft 39 and at its margin at 42 is pivoted a cutter bar or blade 40 having the sharp bottom end 41. As the wheel 38 rotates, the cutter 41 severs the web portion 36 at each revolution of the wheel. The bar 43 has one end fixed to a part of the machine and the other end bored at 45 (slotted) to accommodate the cutter blade. This slot portion is large enough to allow the blade to move laterally to some degree and yet hold the blade in proper position to make the required cuts. These cuts can be made regardless of the kind of plastic which may be flexible or rigid.

FIG. 6 shows the same cutter 37 as in FIG. 1 except that a block 46 is provided having a wide V-shaped depression 47 therein to allow the cutter to sever the plastic web in the manner suggested in the illustration.

FIG. 7 shows a different kind of cutter means. A shaft 48 has keyed thereto a three-quarter form of disc 49 which provides a surface 50 to which is fixed a cutter blade 51. As the disc rotates, the cutter makes its complete cut when in a substantially erect or vertical position, as shown.

In FIG. 8, a pair of wheels 52 and 53 are shown mounted or keyed to their shafts 54 and 55 respectively. Each wheel has its respective cutter blade 56 and 57 and which blades and mounting thereof is the same as shown in FIG. 7. By this arrangement, a pair of blades 56–57 cut into the plastic web between the nails at spaced intervals as indicated in FIG. 8.

Certain novel features and details of this invention are disclosed herein, and in some cases in considerable detail, in order to make the invention clear in at least one form thereof. However, it is to be clearly understood that the invention, as disclosed, is not necessarily limited to the exact form and details disclosed since it is apparent that various modifications and changes may be made without departing from the spirit and scope of the invention.

Having thus described my invention, what is claimed as new and desired to be secured by Letters Patent is:

1. A machine for packaging articles such as nails in plastic strip packs comprising:
   a pair of plastic molding wheels having spaced parallel axes of rotation and circumferentially spaced teeth defining intervening article receiving pockets,
   said wheels being rotatable in opposite directions to cause rotation of said pockets in unison through a molding station between the wheels in such a way that the confronting pockets on the two wheels define mold cavities of slightly greater cross section than said articles,
   carrier means for feeding said articles in succession to said wheel pockets as the latter approach said molding station, whereby said articles enter said mold cavities in succession and travel with said cavities through said molding station,
   plastic feed means for feeding a fluent plastic to said mold cavities as the latter travel through said molding station so as to incapsulate the contained articles in such a way as to form a continuous plastic strip containing the articles emerging from said station, and
   the tips of said teeth on the two wheels being spaced as said teeth travel through said station, whereby said teeth indent said plastic strip between the adjacent articles as said strip and articles emerge from said molding station to form a completed article strip pack having relatively thin frangible connecting webs between the adjacent articles.

2. A packaging machine according to claim 1 wherein: said molding wheels have approximately the same diameter and equal numbers of said teeth and pockets, and the radius of each molding wheel measured to the tips of its teeth is less than one-half the center spacing between said molding wheels, thereby to provide a spacing between the tips of the teeth on said wheels as said teeth rotate through said molding station.

3. A packaging machine according to claim 1 wherein: said carrier means comprises a rotary carrier wheel having circumferentially spaced teeth defining intervening article receiving pockets, means for feeding said articles in succession to said carrier wheel pockets, and said carrier wheel being rotatable on an axis parallel to said molding wheel axes for transporting said articles in sucession along a rotary path of motion passing between said molding wheels.

4. A packaging machine according to claim 3 including:
   means including a circular guide centered on the axis of and extending circumferentially about said carrier wheel for retaining said articles in said carrier wheel pockets, and spring means for urging said guide toward said carrier wheel.

5. A packaging machine according to claim 1 including:
   means for severing the plastic strip pack emerging from said molding wheels in the regions between adjacent articles and into sections of substantially equal length.

6. A packaging machine according to claim 3 including:
   means for severing the plastic strip pack emerging from said molding wheels in the regions between adjacent articles and into sections of substantially equal length.

7. A packaging machine according to claim 3 including:
   a bearing wheel coaxial with said carrier wheel for engaging one end of the articles contained within the carrier wheel pockets for positioning said articles relative to said carrier wheel.

References Cited

UNITED STATES PATENTS

| | | | |
|---|---|---|---|
| 2,497,212 | 2/1950 | Donofrio | 18—21 X |
| 2,593,668 | 4/1952 | Gora | 18—21 X |
| 3,165,868 | 1/1965 | MacDonald et al. | 53—35 |
| 3,303,632 | 2/1967 | Halstead | 18—21 X |
| 3,315,436 | 4/1967 | Baum et al. | 53—35 |

WILBUR L. McBAY, *Primary Examiner.*

U.S. Cl. X.R.

18—21; 53—35, 200; 264—151, 277